United States Patent [19]

Hishinuma

[11] Patent Number: 5,049,747

[45] Date of Patent: Sep. 17, 1991

[54] RADIATION IMAGE RECORDING AND REPRODUCING SYSTEM

[75] Inventor: Kazuhiro Hishinuma, Kanagawa, Japan

[73] Assignee: Fuji Photo Film Co., Ltd., Kanagawa, Japan

[21] Appl. No.: 662,609

[22] Filed: Mar. 1, 1991

[30] Foreign Application Priority Data

Mar. 6, 1990 [JP] Japan .................................. 2-54797

[51] Int. Cl.$^5$ .............................................. H01J 37/22
[52] U.S. Cl. ............................. 250/327.2; 364/413.13
[58] Field of Search ................. 250/327.2 C, 327.2 G, 250/327.2 A, 484.1; 364/413.13

[56] References Cited

U.S. PATENT DOCUMENTS 4,258,264  3/1981  Kotera et al. .
4,739,480  4/1988  Oono et al. ................... 364/413.13
4,958,283  9/1990  Yawara et al. ................ 364/413.13

FOREIGN PATENT DOCUMENTS 56-11395  2/1981  Japan .

Primary Examiner—Jack I. Berman
Assistant Examiner—Richard Hanig
Attorney, Agent, or Firm—Sughrue, Mion, Zinn, Macpeak & Seas

[57] ABSTRACT

A radiation image recording and reproducing system comprises a recording section, a read-out section, a reproducing section, and a signal format converting section. The signal format converting section comprises a first buffer memory for storing the ID information giving specifics about a radiation image, which ID information is received from an external apparatus and has a first signal format, and a second buffer memory for storing the ID information, which has a second signal format adapted to the radiation image recording and reproducing system and into which the ID information having the first signal format was converted. A conversion table memory stores a conversion table. An operation device reads the ID information having the first signal format from the first buffer memory, converts the ID information, which has the first signal format and has been read out of the first buffer memory, into the ID information having the second signal format in accordance with the conversion table, and thereafter stores the ID information, which has the second signal format and has been generated during the conversion, in the second buffer memory.

6 Claims, 3 Drawing Sheets

FIG. 4A

| HOST COMPUTER | RADIATION IMAGE RECORDING AND REPRODUCING SYSTEM |
|---|---|
| 1990 | 2ND YEAR OF HEISEI |
| 1989 | 1ST YEAR OF HEISEI |
| 1988 | 63RD YEAR OF SHOWA |
| 1987 | 62ND YEAR OF SHOWA |
| 1986 | 61ST YEAR OF SHOWA |
| ⋮ | ⋮ |

FIG. 4B

| HOST COMPUTER | RADIATION IMAGE RECORDING AND REPRODUCING SYSTEM |
|---|---|
| CHEST 2R | CHEST, FRONTAL |
|  | CHEST, LATERAL |
| CERVICAL VERTEBRAE 3R | CERVICAL VERTEBRAE, FRONAL |
|  | CERVICAL VERTEBRAE, LATERAL |
|  | CERVICAL VERTEBRAE, OBLIQUE |
| ⋮ | ⋮ |

RADIATION IMAGE RECORDING AND REPRODUCING SYSTEM

BACKGROUND OF THE INVENTION

1. Field of the Invention

This invention relates to a radiation image recording and reproducing system wherein a radiation image is stored on a stimulable phosphor sheet, read out therefrom, and then reproduced as a visible image. This invention particularly relates to a radiation image recording and reproducing system which receives identification information (ID information) giving specifics about a radiation image from an external apparatus, such as a host computer.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then two-dimensionally scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In cases where the radiation image recording and reproducing systems described above are utilized for making diagnoses of human bodies, the radiation dose to human bodies can be kept markedly lower than when conventional X-ray image recording and diagnosing systems are used.

In the radiation image recording and reproducing systems described above, a plurality of radiation images are processed. Therefore, ID information giving specifics about each radiation image, such as the name of the patient recorded, the sex of the patient recorded, the name of the disease of the patient recorded, the diseased part of the patient recorded, and the date on which the image was recorded, is entered into the radiation image recording and reproducing systems. In cases where a plurality of image signals representing the radiation images are stored on a storage means, the ID information is utilized as a data base for retrieving the image signal corresponding to the ID information from the storage means. Alternatively, when a radiation image is reproduced as a visible image, the ID information corresponding to the radiation image is reproduced together with the visible image and utilized in the course of making a diagnosis.

In cases where a radiation image recording and reproducing system is located in, for example, a hospital, it often occurs that the hospital already has its own system, with which the ID information, such as the name of the patient recorded, is stored in a host computer, or the like. In such cases, considerable time and labor are required for operations to be carried out independently for entering the ID information into the host computer, or the like, which has already been located in the hospital, and the radiation image recording and reproducing system which is newly located in the hospital. Therefore, it is desired that the ID information can be entered in the on-line mode from the host computer, or the like, which has already been located in the hospital, into the radiation image recording and reproducing system which is newly located in the hospital. However, the signal format of the ID information stored in a host computer, or the like, has not been standardized, but varies for different hospitals, or the like. Accordingly, when the host computer, or the like, and the radiation image recording and reproducing system are connected to each other, a signal format converting means, such as a signal format converting program, must be designed independently in accordance with the location of the host computer, or the like, and the radiation image recording and reproducing system (e.g. the hospital). In such cases, considerable time, labor, and expense are required for such a signal format converting means to be designed.

SUMMARY OF THE INVENTION

The primary object of the present invention is to provide a radiation image recording and reproducing system, which is provided with a signal format converting means capable of being used widely even if the signal format of ID information varies for different locations.

Another object of the present invention is to provide a radiation image recording and reproducing system, for which no particular work requiring considerable time, labor, and expense, such as the design of a specific signal format converting means, need be carried out during the system installation.

The present invention provides a radiation image recording and reproducing system, which comprises:
i) an image recording section for irradiating radiation, which carries image information about an object, onto a stimulable phosphor sheet, a radiation image of the object being thereby stored on the stimulable phosphor sheet,
ii) an image read-out section for exposing a stimulable phosphor sheet, on which a radiation image was stored, to stimulating rays, which cause the stimulable phosphor sheet to emit light in proportion to the amount of energy stored thereon during its exposure to the radiation, the emitted light being detected and converted into an image signal, and
iii) an image reproducing section for reproducing a visible image of a radiation image from an image signal, wherein the improvement comprises the provision of a signal format converting section for receiving ID information from an external apparatus, which ID information gives specifics about a radiation image and has a first signal format, and converting said ID information into ID information having a second signal format adapted to the radiation image recording and reproducing system, said signal format converting section comprising:
a) a first buffer memory for storing the ID information, which is received from the external apparatus and has the first signal format,
b) a second buffer memory for storing the ID information, which has the second signal format and into which the ID information having the first signal format was converted,
c) a conversion table memory for storing a conversion table, which is used during the conversion of the ID information having the first signal format into the ID information having the second signal format, and
d) an operation means for reading the ID information having the first signal format from said first buffer memory, converting the ID information, which has the first signal format and has been read out of said first buffer memory, into the ID information having the second signal format in accordance with said conversion table, and thereafter storing the ID information, which has the second signal format and has been generated during the conversion, in said second buffer memory.

With the radiation image recording and reproducing system in accordance with the present invention, the conversion table is stored on the conversion table memory. In accordance with the conversion table, the ID information, which has the first signal format and has been read out of the first buffer memory, is converted into the ID information having the second signal format adapted to the radiation image recording and reproducing system. Thereafter, the ID information, which has the second signal format and has been generated during the conversion, is stored in the second buffer memory. Therefore, even if the first signal format varies for different locations of the radiation image recording and reproducing system, the radiation image recording and reproducing system can be adapted to its location only by rewriting the conversion table. Accordingly, the radiation image recording and reproducing system in accordance with the present invention can be used widely even if the signal format of ID information varies for different locations. Also, when the radiation image recording and reproducing system in accordance with the present invention is located in a hospital, or the like, no particular designing work requiring considerable time, labor, and expense, such as the design of a specific signal format converting means, need be carried out.

BRIEF DESCRIPTION OF THE DRAWINGS

FIGS. 4A and 4B are diagrams showing examples of conversion tables.

DESCRIPTION OF THE PREFERRED EMBODIMENTS

The present invention will hereinbelow be described in further detail with reference to the accompanying drawings.

Figure 1:
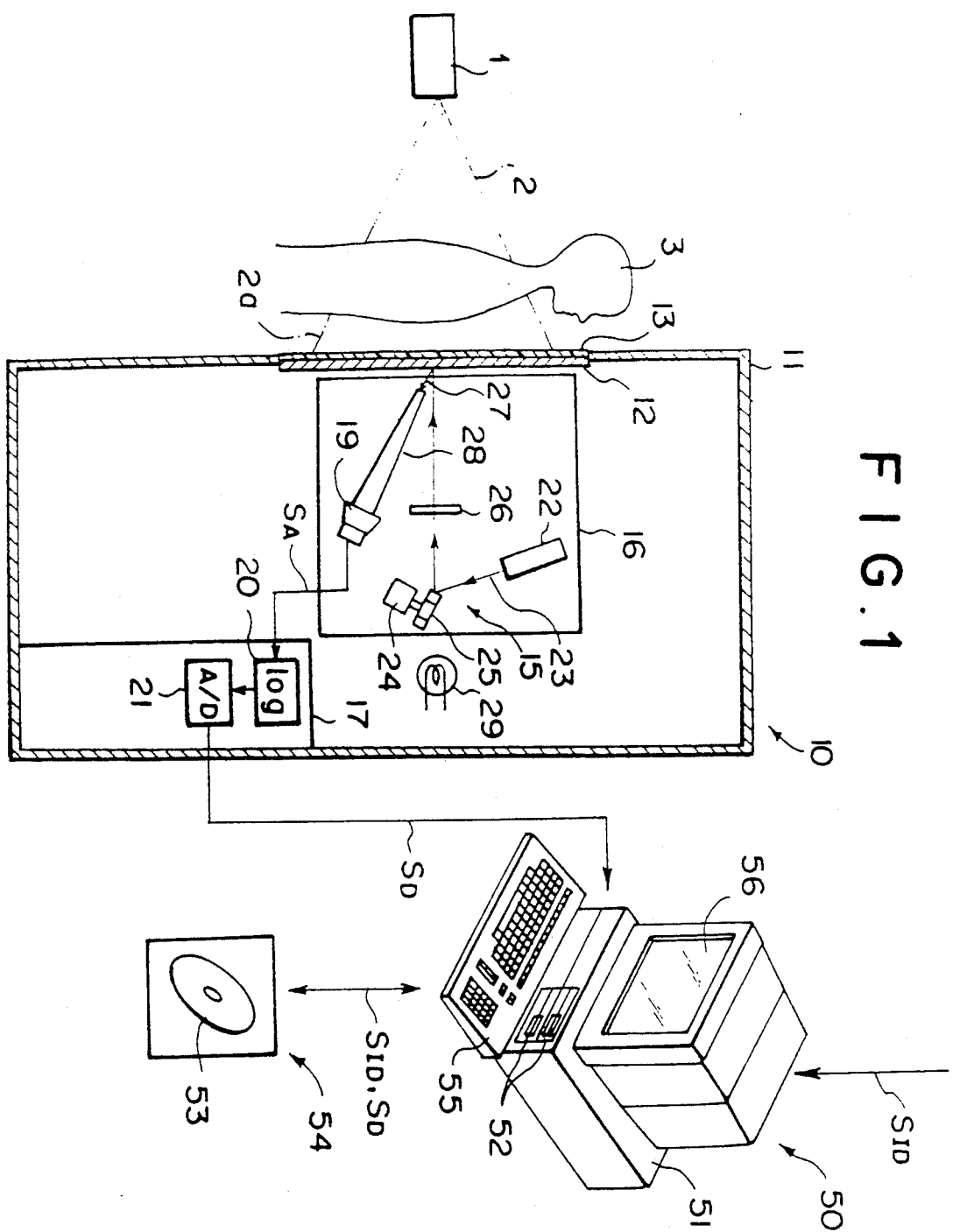
FIG. 1 is a schematic view showing an embodiment of the radiation image recording and reproducing system in accordance with the present invention.

FIG. 1 is a schematic view showing an embodiment of the radiation image recording and reproducing system in accordance with the present invention. This embodiment is used in making a diagnosis of a patient and located in a hospital.

X-rays 2 are produced by an X-ray source 1 and irradiated to an object (patient) 3. The X-rays 2 pass through the object 3 and then impinge upon a stimulable phosphor sheet 12. The stimulable phosphor sheet 12 is secured to a sheet supporting region of a housing 11 of an image recording and read-out section 10. A filter 13, which transmits the X-rays 2 and filters out visible light, is located on the front surface of the stimulable phosphor sheet 12. X-rays 2a, which have passed through the object 3 and carries image information about the object 3, impinge upon the stimulable phosphor sheet 12. As a result, energy from the X-rays 2a (i.e. an X-ray image of the object 3) is stored on the stimulable phosphor sheet 12. Thereafter, the X-ray image is read out from the stimulable phosphor sheet 12.

During the image read-out operation, a movable frame 16 moves up to a position, at which a laser beam 23 described below scans the top part of the stimulable phosphor sheet 12. Thereafter, the X-ray image is read out from the stimulable phosphor sheet 12 while the movable frame 16 is moving down (i.e. in a sub-scanning direction).

The laser beam 23, which serves as stimulating rays, is produced by a laser beam source 22, and is reflected and deflected by a rotating polygon mirror 25, which is quickly rotated by a motor 24. The laser beam 23 then passes through a converging lens 26, which may be constituted of an fθ lens or the like. The laser beam 23 impinges upon the stimulable phosphor sheet 12 and scans it in a main scanning direction, which direction is approximately normal to the plane of the sheet of FIG. 1, i.e. to the sub-scanning direction along which the movable frame moves (vertical direction in FIG. 1). When the stimulable phosphor sheet 12 is exposed to the laser beam 23, the exposed portion of the stimulable phosphor sheet 12 emits light 27 in an amount proportional to the amount of energy stored thereon during its exposure to the X-rays. The emitted light 27 is guided by a light guide member 28 and photoelectrically detected by a photomultiplier 19.

An analog signal SA generated by the photomultiplier 19 is logarithmically amplified by a logarithmic amplifier 20, and digitized by an A/D converter 21 into a digital image signal SD. The digital image signal SD is then fed into an image processing and displaying section 50, which will be described later.

In the image recording and read-out section 10, after the X-ray image has been read out from the stimulable phosphor sheet 12, the movable frame 16 is moved down and completely retracted from the position facing the rear surface of the stimulable phosphor sheet 12. An erasing light source 29 is then turned on, and erasing light produced by the erasing light source 29 is irradiated to the whole surface of the stimulable phosphor sheet 12. In this manner, any energy remaining on the stimulable phosphor sheet 12 is released therefrom. Therefore, the stimulable phosphor sheet 12 can then be reused in the recording of an X-ray image.

The image processing and displaying section 50 comprises a main body 51 in which a CPU and an internal memory are incorporated, a disk drive unit 52 which operates a floppy disk serving as a subsidiary memory, a storage device 54 for storing the image signal SD, or the like, on an optical disk 53, a keyboard 55 from which necessary information is fed into the radiation image recording and reproducing system, and a CRT display device 56 which reproduces a visible image from the image signal SD and displays it. The information entered from the keyboard 55 includes ID information giving specifics about the X-ray image, which was stored on the stimulable phosphor sheet 12, such as the name of the patient (object) recorded, the sex of the patient recorded, the portion of the patient the image of which was recorded, the name of the disease of the patient recorded, and the date on which the image was recorded. However, the image processing and displaying section 50 is connected to a host computer of the hospital, in which the radiation image recording and reproducing system is located. Ordinarily, instead of being entered from the keyboard 55, the ID information is entered as an ID signal SID from the host computer.

The image processing and displaying section 50 carries out appropriate image processing, such as compensation for shading and decay, on the image signal SD. The image signal SD, which has thus been processed, is stored by the storage device 54 together with the ID signal SID. Also, a visible image is reproduced from the image signal SD and displayed on the CRT display device 56. The storage device 54 stores a plurality of image signals SD. When the ID information is entered from the keyboard 55, the image signal SD corresponding to the ID information is read out of the storage device 54. When necessary, the image signal SD, which has thus been read out of the storage device 54, is subjected to appropriate image processing. The image signal SD is then used during the reproduction of a visible image on the CRT display device 56.

The term "compensation for shading" as used herein means the compensation for a change in the image signal SD, which change is caused to occur by a change in the sensitivity, with which the light emitted by the stimulable phosphor sheet 12 in the course of being scanned with the laser beam 23 is detected by the combination of the light guide member 28 and the photomultiplier 19 as a whole along the main scanning direction. The term "compensation for decay" as used herein means the compensation for the gradual decay of energy stored on the stimulable phosphor sheet 12, which decay occurs before the stimulable phosphor sheet 12 is exposed to the laser beam 23. Therefore, the compensation for decay is carried out primarily with respect to a change in the image signal SD, which change occurs with respect to the sub-scanning direction along which the movable frame 16 moves.

As shown in FIG. 1, the image processing and displaying section 50 may be located in the exterior of the image recording and read-out section 10. Alternatively, the image processing and displaying section 50 may be located within the main body of the image recording and read-out section 10.

Figure 2:
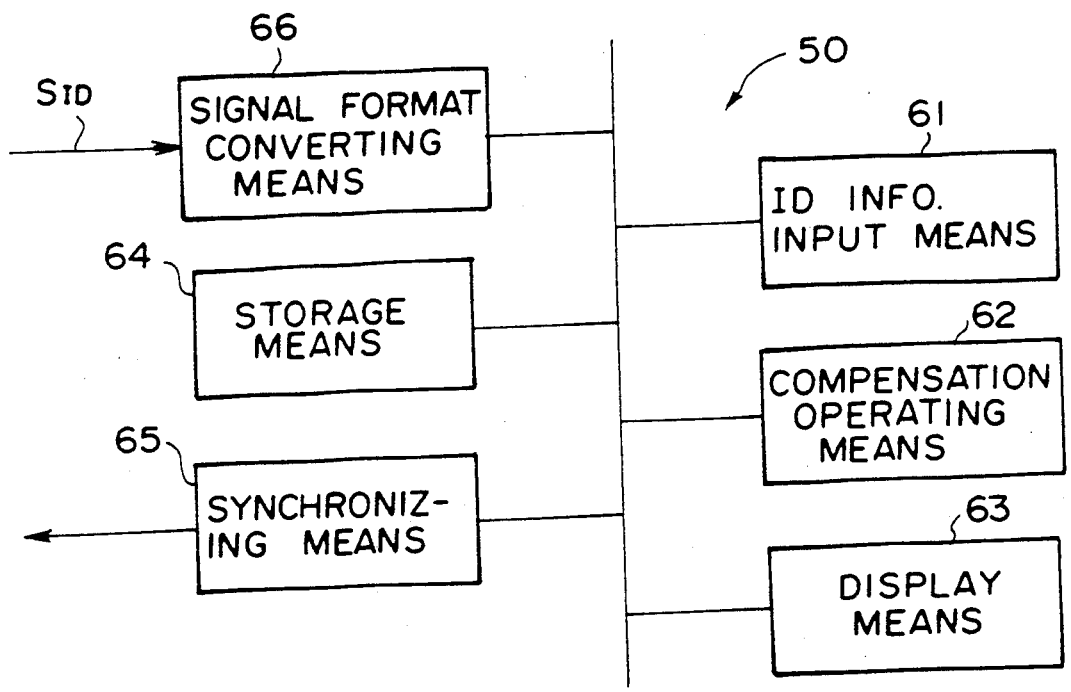
FIG. 2 is a block diagram showing the functions of an image processing and displaying section in the embodiment of FIG. 1.

FIG. 2 is a block diagram showing the functions of the image processing and displaying section 50.

With reference to FIG. 2, the image processing and displaying section 50 is provided with an ID information input means 61, which is independent of the means for transmitting the ID signal SID from the host computer. The keyboard 55 shown in FIG. 1 corresponds to the ID information input means 61.

The image processing and displaying section 50 is also provided with a compensation operating means 62, which compensates the image signal SD for shading, decay, or the like. A compensation operating program, which is executed by the CPU in the main body 51 shown in FIG. 1, corresponds to the compensation operating means 62.

The image processing and displaying section 50 is further provided with a display means 63 and a storage means 64, which respectively correspond to the CRT display device 56 and the storage device 54 shown in FIG. 1.

The image processing and displaying section 50 also comprises a synchronization means 65, which controls the timing with which each of the members of the radiation image recording and reproducing system shown in FIG. 1 operates. For example, the synchronization means 65 controls the timing with which the X-ray source 1 produces the X-rays 2, the timing with which the movable frame 16 moves, the timing with which the X-ray image is read out, and the timing with which the erasing light source 29 is turned on. The synchronization means 65 is constituted of a timing control program, which is executed by the CPU, and transmission lines for transmitting control signals to various parts of the radiation image recording and reproducing system.

The image processing and displaying section 50 further comprises a signal format converting means 66, which receives the ID signal SID having a predetermined signal format from the host computer (not shown in FIG. 2) and converts it into an ID signal S'ID having a signal format adapted to the radiation image recording and reproducing system. The signal format of the ID signal SID, which is received from the host computer, is determined independently of the signal format of the ID signal S'ID, which is used in the radiation image recording and reproducing system. Therefore, the ID signal SID received from the host computer cannot be directly taken into the radiation image recording and reproducing system. Accordingly, the signal format converting means 66 converts the signal format in the manner described below.

Figure 3:
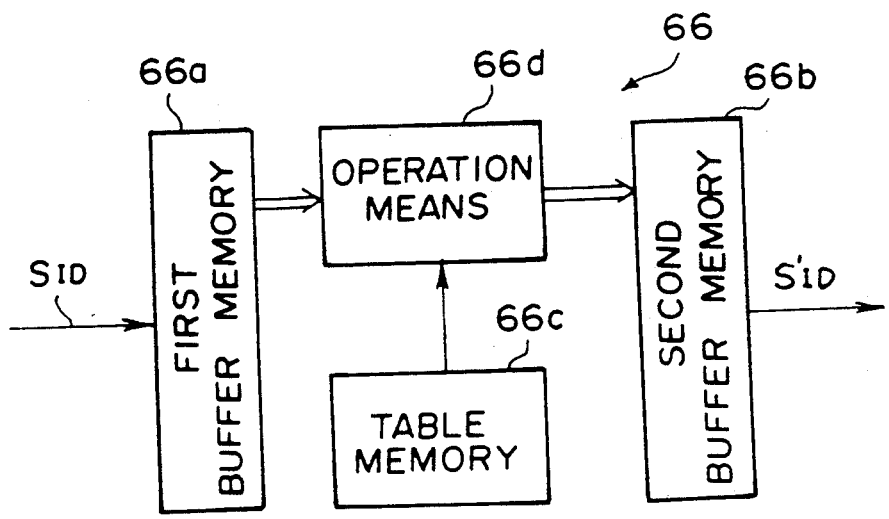
FIG. 3 is a block diagram showing how a signal format converting means shown in FIG. 2 is constituted.

FIG. 3 is a block diagram showing how the signal format converting means 66 is constituted.

With reference to FIG. 3, a table memory 66c stores conversion tables showing the relationship between the signal format of the ID signal SID, which is used in the host computer, and the signal format of the ID signal S'ID, which is used in the radiation image recording and reproducing system.

FIGS. 4A and 4B are diagrams showing examples of the conversion tables.

The ID information includes the date on which an image was recorded. As for the year in which an image was recorded, the Christian Era is used in the host computer, and the Japanese Era is used in the radiation image recording and reproducing system. Therefore, the conversion table shown in FIG. 4A is stored in the table memory 66c. As shown in FIG. 4B, as for the portion of a patient the image of which was recorded, "chest 2R" used in the host computer corresponds to a set of a frontal chest image and a lateral chest image in the radiation image recording and reproducing system. Also, "cervical vertebrae 3R" used in the host computer corresponds to a set of a frontal cervical vertebrae image, a lateral cervical vertebrae image, and an oblique cervical vertebrae image in the radiation image recording and reproducing system. Therefore, the conversion table shown in FIG. 4B is also stored in the table memory 66c. In such cases, actually, when a single piece of ID information is designated from the host computer, the information about two or three image recording/read-out operations is generated. As in this example, the table memory 66c stores all of conversion tables with respect to the signal format of the ID signal SID, which is transmitted between the host computer and the radiation image recording and reproducing system.

The ID signal SID received from the host computer is temporarily stored in a first buffer memory 66a. Thereafter, an operation means 66d reads the ID signal SID from the first buffer memory 66a, refers to a conversion table stored in the table memory 66c, and converts the signal format of the ID signal SID into the signal format of the ID signal S'ID. The ID signal S'ID thus generated is stored in a second buffer memory 66b. The ID signal S'ID, which has the signal format adapted to the radiation image recording and reproducing system, is then read from the second buffer memory 66b and fed into the radiation image recording and reproducing system. The ID signal S'ID is then used as a data base, which is used when a desired image signal is to be retrieved from a plurality of image signals stored in the storage device 54 shown in FIG. 1. Alternatively, the ID signal S'ID is used as information which accompanies a visible image displayed on the CRT display device 56. As described above, in this embodiment, the conversion tables are stored in the table memory 66c, and the signal format is converted with reference to the conversion tables. Therefore, only by rewriting the conversion tables, the radiation image recording and reproducing system in accordance with the present invention can be used widely in various locations, at which different signal formats of ID information are utilized in host computers, or the like.

In the embodiment described above, the signal format converting means 66 converts the ID signal SID, which is received from the host computer, into the ID signal S'ID having a signal format adapted to the radiation image recording and reproducing system. The signal format converting means 66 may work bilaterally such that it is also capable of converting an ID signal, which is entered from the keyboard 55, into an ID signal having a signal format adapted to the host computer, and feeding the converted ID signal into the host computer.

I claim:

1. A radiation image recording and reproducing system, which comprises:
    i) an image recording section for irradiating radiation, which carries image information about an object, onto a stimulable phosphor sheet, a radiation image of the object being thereby stored on the stimulable phosphor sheet,
    ii) an image read-out section for exposing a stimulable phosphor sheet, on which a radiation image was stored, to stimulating rays, which cause the stimulable phosphor sheet to emit light in proportion to the amount of energy stored thereon during its exposure to the radiation, the emitted light being detected and converted into an image signal, and
    iii) an image reproducing section for reproducing a visible image of a radiation image from an image signal,
    wherein the improvement comprises the provision of a signal format converting section for receiving ID information from an external apparatus, which ID information gives specifics about a radiation image and has a first signal format, and converting said ID information into ID information having a second signal format adapted to the radiation image recording and reproducing system, said signal format converting section comprising:
        a) a first buffer memory for storing the ID information, which is received from the external apparatus and has the first signal format,
        b) a second buffer memory for storing the ID information, which has the second signal format and into which the ID information having the first signal format was converted,
        c) a conversion table memory for storing a conversion table, which is used during the conversion of the ID information having the first signal format into the ID information having the second signal format, and
        d) an operation means for reading the ID information having the first signal format from said first buffer memory, converting the ID information, which has the first signal format and has been read out of said first buffer memory, into the ID information having the second signal format in accordance with said conversion table, and thereafter storing the ID information, which has the second signal format and has been generated during the conversion, in said second buffer memory.

2. A system as defined in claim 1 wherein said signal format converting section works bilaterally such that it is capable of converting the ID information having the second signal format, which is adapted to the radiation image recording and reproducing system, into ID information having the first signal format adapted to an external apparatus.

3. A system as defined in claim 1 wherein said stimulable phosphor sheet, on which a radiation image was stored, is two-dimensionally scanned with said stimulating rays in said image read-out section.

4. A system as defined in claim 1 wherein said stimulating rays are a laser beam.

5. A system as defined in claim 1 wherein said radiation is X-rays.

6. A system as defined in claim 1 wherein an erasing section is provided for releasing any energy remaining on a stimulable phosphor sheet after an image signal has been obtained therefrom in said image read-out section.

* * * * *